United States Patent
Ando (10) Patent No.: US 7,587,735 B2
(45) Date of Patent: Sep. 8, 2009

(54) MULTIMEDIA-DATA TRANSMISSION SYSTEM, APPARATUS AND METHOD

(75) Inventor: Tsutomu Ando, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1050 days.

(21) Appl. No.: 09/962,108

(22) Filed: Sep. 26, 2001

(65) Prior Publication Data

US 2002/0040478 A1 Apr. 4, 2002

(30) Foreign Application Priority Data

Oct. 3, 2000 (JP) ............................. 2000-304024

(51) Int. Cl.
- H04N 7/173 (2006.01)
- H04N 7/10 (2006.01)
- H04J 3/24 (2006.01)
- H04N 7/14 (2006.01)

(52) U.S. Cl. ........................... 725/93; 725/87; 725/114; 725/115

(58) Field of Classification Search ................... 725/87, 725/115, 117, 93–95
See application file for complete search history.

(56) References Cited

U.S. PATENT DOCUMENTS

| | | | | |
|---|---|---|---|---|
| 4,734,765 A | * | 3/1988 | Okada et al. | 348/107 |
| 5,132,992 A | * | 7/1992 | Yurt et al. | 375/240 |
| 5,311,423 A | * | 5/1994 | Clark | 705/8 |
| 5,371,532 A | * | 12/1994 | Gelman et al. | 725/88 |
| 5,550,577 A | * | 8/1996 | Verbiest et al. | 725/92 |
| 5,583,995 A | * | 12/1996 | Gardner et al. | 709/219 |
| 5,659,539 A | * | 8/1997 | Porter et al. | 709/231 |
| 5,757,416 A | * | 5/1998 | Birch et al. | 725/144 |
| 5,850,218 A | * | 12/1998 | LaJoie et al. | 725/45 |
| 6,049,823 A | * | 4/2000 | Hwang | 725/82 |
| 6,128,467 A | * | 10/2000 | Rege | 725/116 |
| 6,266,817 B1 | * | 7/2001 | Chaddha | 725/146 |
| 6,584,125 B1 | * | 6/2003 | Katto | 370/537 |
| 6,848,117 B1 | * | 1/2005 | Emura | 725/87 |
| 2002/0056081 A1 | * | 5/2002 | Morley et al. | 725/1 |
| 2005/0010960 A1 | * | 1/2005 | Kitazawa et al. | 725/117 |

* cited by examiner

*Primary Examiner*—Christopher Kelley
*Assistant Examiner*—Reuben M Brown
(74) *Attorney, Agent, or Firm*—Fitzpatrick, Cella, Harper & Scinto (57) ABSTRACT

In a system for transmitting multimedia data including video data, audio data, graphic data, text data and the like via a network, sets of media data are stored in a plurality of servers in a distributed state. When requested multimedia data is assigned from a transmitter, necessary sets of data from among media data stored in the servers in a distributed state are acquired by corresponding receivers in accordance with the assignment. A synchronization control unit and a multiplexer multiplex the acquired media data based on time stamps of the data, and transmit multimedia data after the multiplexing to a client which has assigned the multimedia data. According to such a configuration, distributed multimedia servers can be constructed without taking into consideration of influence by the effective rates of transmission channels from the respective servers.

8 Claims, 9 Drawing Sheets

MULTIMEDIA-DATA TRANSMISSION SYSTEM, APPARATUS AND METHOD

BACKGROUND OF THE INVENTION

1. Field of the Invention

The present invention relates to a system, apparatus and method for transmitting multimedia data including video data, audio data and the like.

2. Description of the Related Art

Figure 3:
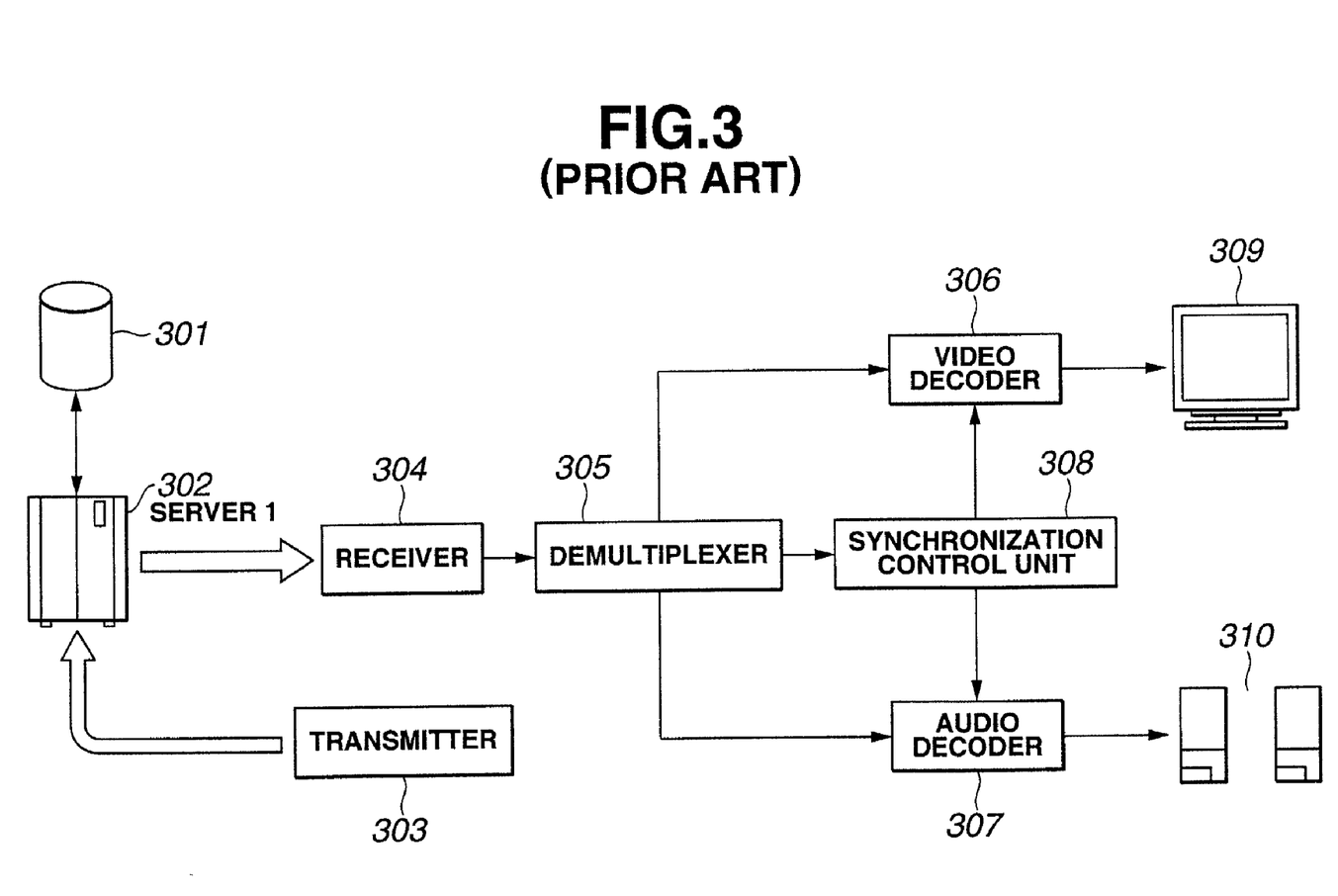
FIG. 3 is a diagram illustrating a conventional apparatus for transmitting multimedia data.

Nowadays, various methods for distributing multimedia data including text, moving pictures, sounds and the like via a network in real time have been practically utilized. FIG. 3 is a block diagram illustrating an example of the configuration of an ordinary multimedia-data distribution system in which a single distribution server 302 is used.

In FIG. 3, a storage medium 301, such as a hard disk or the like, stores multimedia data including text, moving pictures, sounds and the like. Usually, the data is compressed (encoded) in advance by an optimum method. This data form is called a bitstream.

Figure 4:
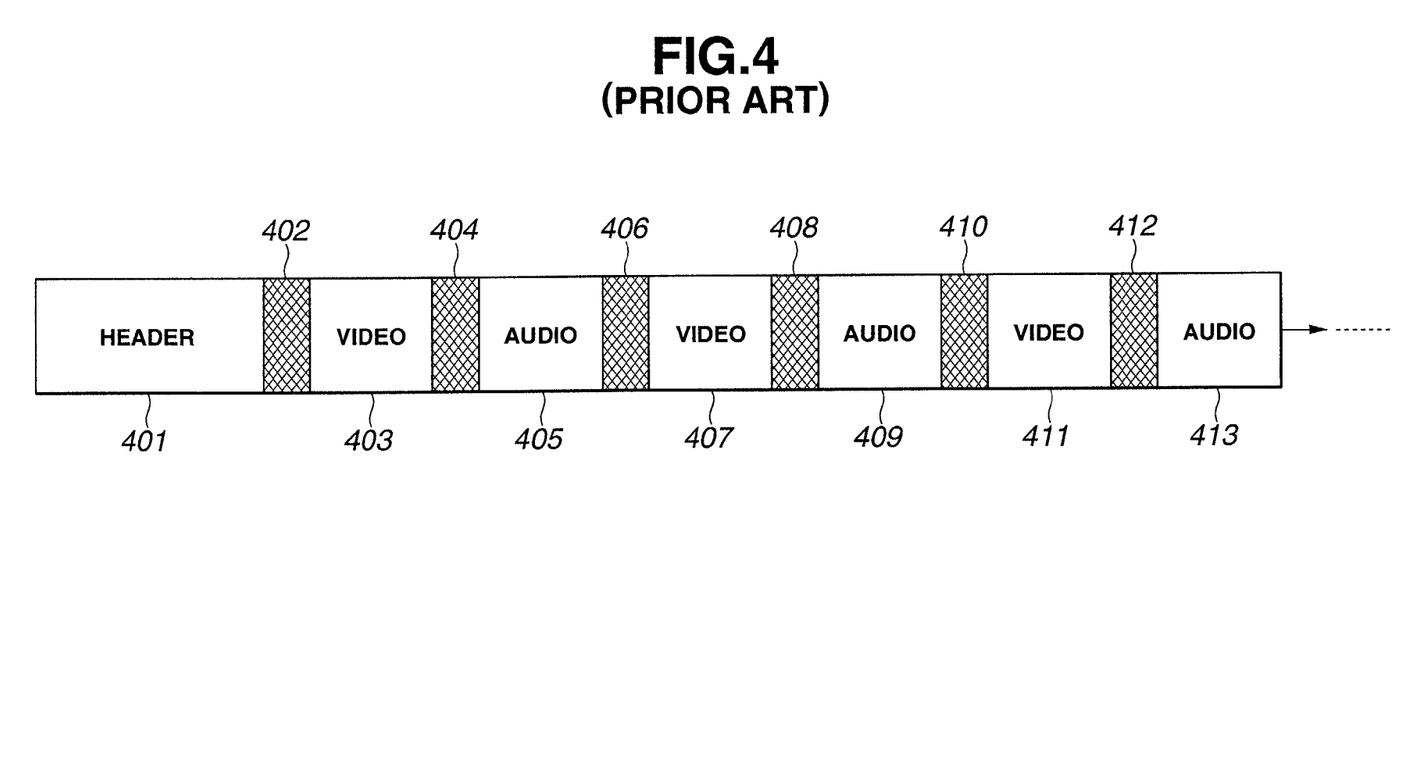
FIG. 4 is a diagram illustrating an example of superposition of multimedia data.

FIG. 4 is a diagram illustrating a manner in which bitstreams of video data and audio data are superposed. When simultaneously transmitting video data and audio data, the two types of data are superposed by being divided into data having a specific size, as shown in FIG. 4. In FIG. 4, there are shown header information 401, video bitstreams 403, 407 and 411, and audio bitstreams 405, 409 and 413. Time information called a time stamp is simultaneously added to each bitstream. In FIG. 4, there are shown times stamps 402, 406 and 410 for respective succeeding video bitstreams, and time stamps 404, 408 and 412 for respective succeeding audio bitstreams.

Returning to FIG. 3, a transmitter 303 at the client side assigns for a distribution server 302 data for specifying bitstream data required by a client. The distribution server 302 distributes bitstream data in response to a request from the client. A receiver 304 receives bitstreams from a transmission channel.

A demultiplexer 305 divides received bitstream data in units of a video bitstream and an audio bitstream. A video decoder 306 and an audio decoder 307 decode video bitstreams and audio bitstreams, respectively. A synchronization control unit 308 receives video and audio synchronization control data (time stamps) from the demultiplexer 305, and performs synchronization control for reproducing video and audio data. There are also shown a video reproducer 309, and an audio reproducer 310.

Figure 5:
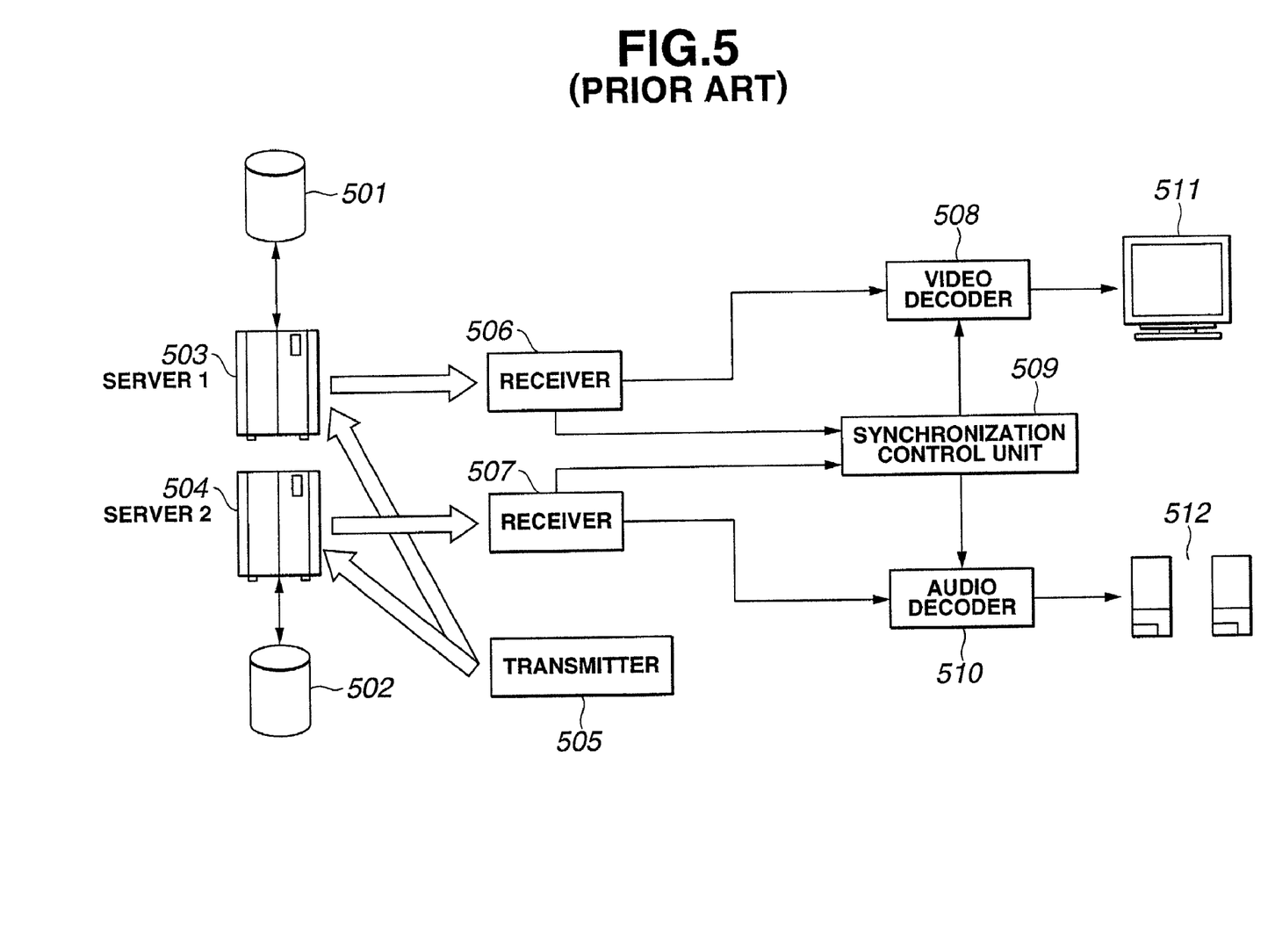
FIG. 5 is a diagram illustrating another conventional apparatus for transmitting multimedia data.

Next, another configuration of the system will be described with reference to FIG. 5. FIG. 5 is a block diagram illustrating another example of the configuration of an ordinary multimedia-data distribution system in which a plurality of distribution servers 503 and 504 are used.

In FIG. 5, there are shown storage media 501 and 502, such as hard disks or the like, for storing data distributed from a server 1 503 and a server 2 504, respectively. Each of the distribution server 1 503 and the distribution server 2 504 distributes bitstream data in response to a client's request. In this case, video bitstreams and audio bitstreams are provided in different servers, i.e., in the server 1 503 and the server 2 504, respectively.

A request is transmitted from a transmitter 505 at the client side to each distribution server and is received by a separate receiver (not necessarily a physical receiver, but control may be performed by a plurality of sessions on the same transmission channel).

When respective media are provided in a state of being distributed in such a manner, the relationship between the respective media is described in an appropriate language and the positions of the respective media are clearly indicated (by URL (Uniform Resource Locator) or the like). The method of description will not be particularly mentioned in this specification.

Receivers 506 and 507 at the client side receive bitstream data from corresponding distribution servers. The receivers 506 and 507 are not necessarily physically separated, but are often provided in the form of software modules capable of performing transmission sessions with corresponding servers. In the case of FIG. 5, since data is already divided into bitstreams for respective media, demultiplexing is unnecessary, and received bitstreams are directly transmitted to corresponding ones of decoders 508 and 510. Subsequent processing after this stage is the same as in the conventional case shown in FIG. 3.

A video decoder 508 and an audio decoder 510 decode video bitstreams and audio bitstreams, respectively. A synchronization control unit 509 receives video and audio synchronization control data from the receivers 506 and 507, respectively, and performs synchronization control for reproducing video and audio data. There are also shown a video reproducer 511 and an audio reproducer 512.

However, in the case shown in FIG. 3, since it is necessary to store in advance video and audio multimedia bitstreams by multiplexing the data, this approach is inadequate for applications such as a distributed database and the like.

In the case shown in FIG. 5, there is the possibility that in a transmission channel from the server 1 to the client and a transmission channel from the server 2 to the client, it is sometimes difficult to realize optimum synchronization at the receiving client side due to differences in the transmission rate and the state of the network.

SUMMARY OF THE INVENTION

The present invention has been made in consideration of the above-described problems. It is an object of the present invention to allow a more optimum synchronization at the reception side in a distributed database of multimedia data even if sets of data are transmitted at different effective transmission rates.

According to one aspect, the present invention which achieves the above-described object relates to a multimedia-data transmission system for transmitting multimedia data via a network. The system includes client for assigning multimedia data to be transmitted, at least one server for storing multimedia data in a distributed state, at least one receiver corresponding to the at least one server, each for acquiring multimedia data stored in corresponding ones of the at least one server in accordance with the assignment, multiplexer for multiplexing the acquired multimedia data based on time-management information added to the media data, and transmission means for transmitting the multiplexed multimedia data obtained as a result of the multiplexing to the client, serving as a source of the assignment.

According to another aspect, the present invention which achieves the above-described object relates to a transmission method for acquiring multimedia data from at least one server storing multimedia data in a distributed state, and for transmitting multimedia data to client, via a network. The method includes an acquisition step of acquiring the multimedia data from the at least one server in accordance with assignment of multimedia data from the client, a multiplexing step of obtaining multiplexed multimedia data by multiplexing the acquired multimedia data based on time-management information added to the acquired multimedia data, and a transmission step of transmitting the multiplexed multimedia data obtained as a result of the multiplexing to the client, serving as a source of the assignment.

According to still another aspect, the present invention which achieves the above-described object relates to a control program for realizing transmission control for acquiring multimedia data from at least one server storing media data in a distributed state, and for transmitting multimedia data to client, via a network by a computer. The control program includes code for acquiring the multimedia data from the at least one server in accordance with assignment of multimedia data from the client, code for multiplexing to obtain multimedia data by multiplexing the acquired multimedia data based on time-management information added to the acquired multimedia data, and code for transmitting the multiplexed multimedia data obtained as a result of the multiplexing to the client, serving as a source of the assignment.

According to yet another aspect, the present invention which achieves the above-described object relates to a transmission apparatus for acquiring multimedia data from at least one server storing media data in a distributed state, and for transmitting multimedia data to client, via a network. The apparatus includes acquisition means for acquiring the multimedia data from the at least one server in accordance with assignment of multimedia data from the client, multiplexer means for obtaining multimedia data by multiplexing the acquired multimedia data based on time-management information added to the acquired multimedia data, and transmission means for transmitting the multiplexed multimedia data obtained as a result of the multiplexing to the client, serving as a source of the assignment.

Other features and advantages of the patent invention will be apparent from the following description taken in conjunction with the accompanying drawings, in which reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described with reference to the drawings.

First Embodiment

Figure 1:
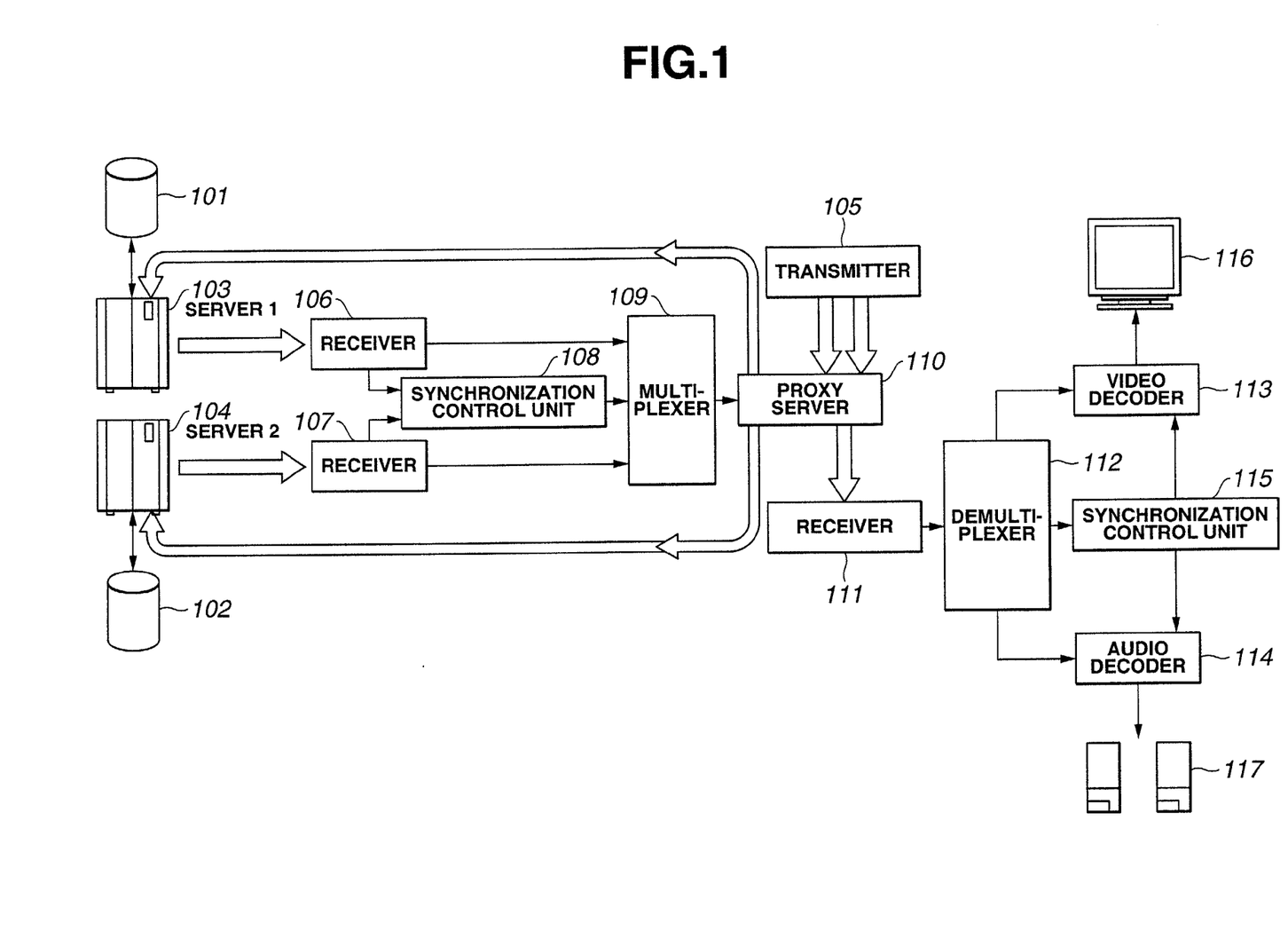
FIG. 1 is a diagram illustrating the configuration of an apparatus according to a first embodiment of the present invention.

FIG. 1 is a block diagram illustrating the configuration of a multimedia-data distribution system according to a first embodiment of the present invention. In FIG. 1, components 101-107 have the same configurations as the components 501-507 shown in FIG. 5, respectively. However, each of receivers 106 and 107 operates as a receiver of a proxy server 110.

A synchronization control unit 108 performs synchronization control of bit-stream data received by the receivers 106 and 107. More specifically, the synchronization control unit 108 extracts time information (a time stamp) from each bit-stream received by receivers 106 and 107, and appropriately performs time adjustment between the bitstreams in accordance with the time information.

A multiplexer 109 multiplexes bitstreams separately received from receivers 106 and 107, while the synchronization control unit 108 monitors time information of each of the received media bitstreams. Multiplexer 109 provides the multiplexed bitstreams to proxy server 110. Proxy server 110 transmits the multiplexed bitstreams to the client in place of actual server 1 and server 2. Components 106-110, which perform reception from servers, multiplexing and retransmission, may be combined to form a media proxy server. Reference numeral 105 represents a transmitter at the client side. A request for transfer to a server is performed via the proxy server 110.

Figure 7:
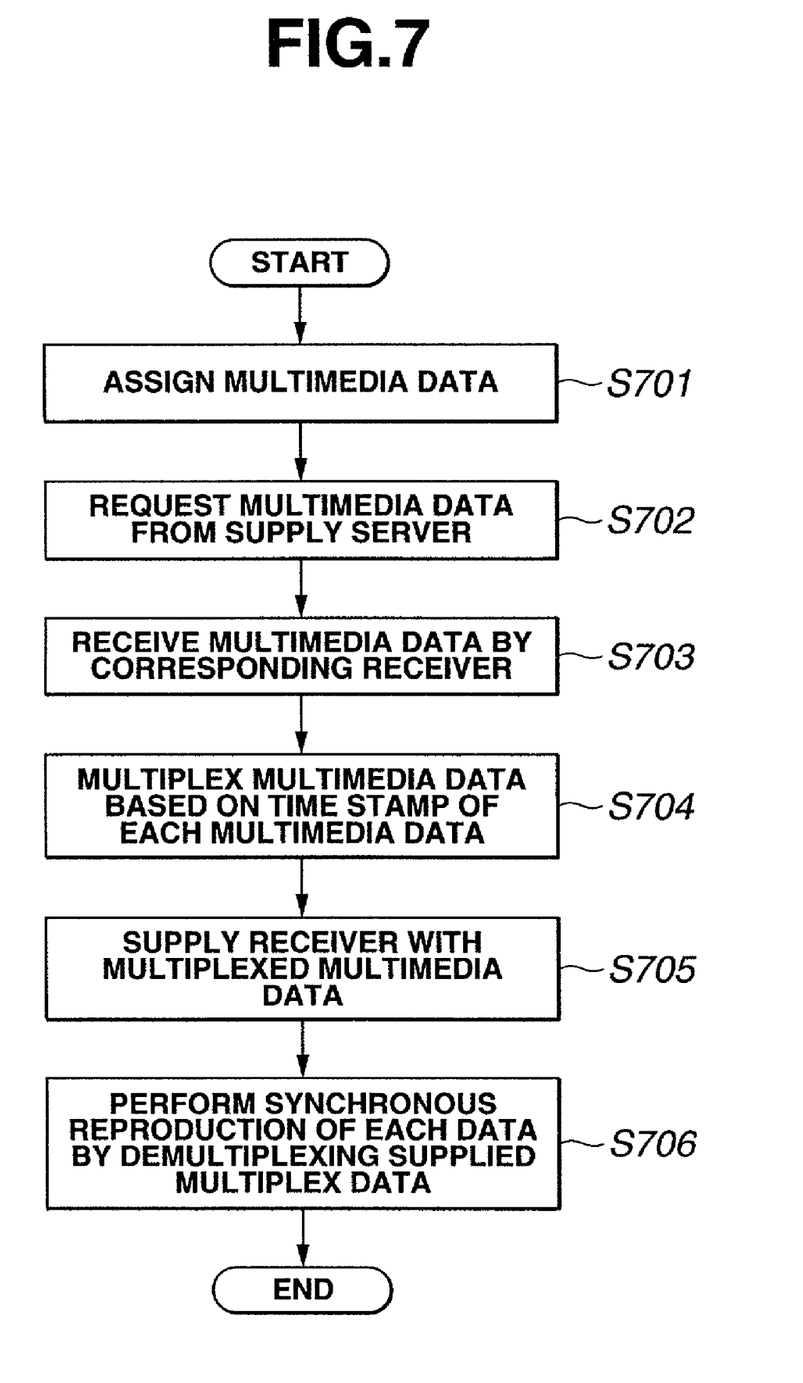
FIG. 7 is a flowchart illustrating an operation by a multimedia distribution system according to the first embodiment.

The operation of the system of the first embodiment having the above-described configuration will now be described. FIG. 7 is a flowchart illustrating the operation by the multimedia distribution system of the first embodiment.

First, in step S701, desired multimedia data is assigned from the client's transmitter 105 to the proxy server 110. Then, in step S702, the proxy server 110 determines a server storing each multimedia data constituting the multimedia data from the assigned multimedia data, and requests the respective multimedia data.

Servers 103 and 104, each receive a request for multimedia data, and transmit the multimedia data to the receivers 106 and 107, respectively, each of which receives the transmitted multimedia data (step S703). The receivers 106 and 107 are not necessarily physically separated, but may be mounted as software modules capable of performing a transmission session to corresponding servers. Then, the multiplexer 109 multiplexes the multimedia data received by the receivers 106 and 107 under time management by the synchronization control unit 108, and transmits the obtained multimedia data to the proxy server 110 (step S704). As described above, the components 106-110 that perform reception from the servers, multiplexing, and retransmission of the multimedia data to the client may be configured by a single apparatus as a media proxy server.

The proxy server 110 that has received the multimedia data from the multiplexer 109 transmits the received multimedia data to a receiver 111 at the client side (step S705). The client side demultiplexes the multimedia data received by the receiver 111 to reproduce respective multimedia data, using a demultiplexer 112, a video decoder 113, an audio decoder 114 and a synchronization control unit 115 (step S706).

Second Embodiment

Figure 2:
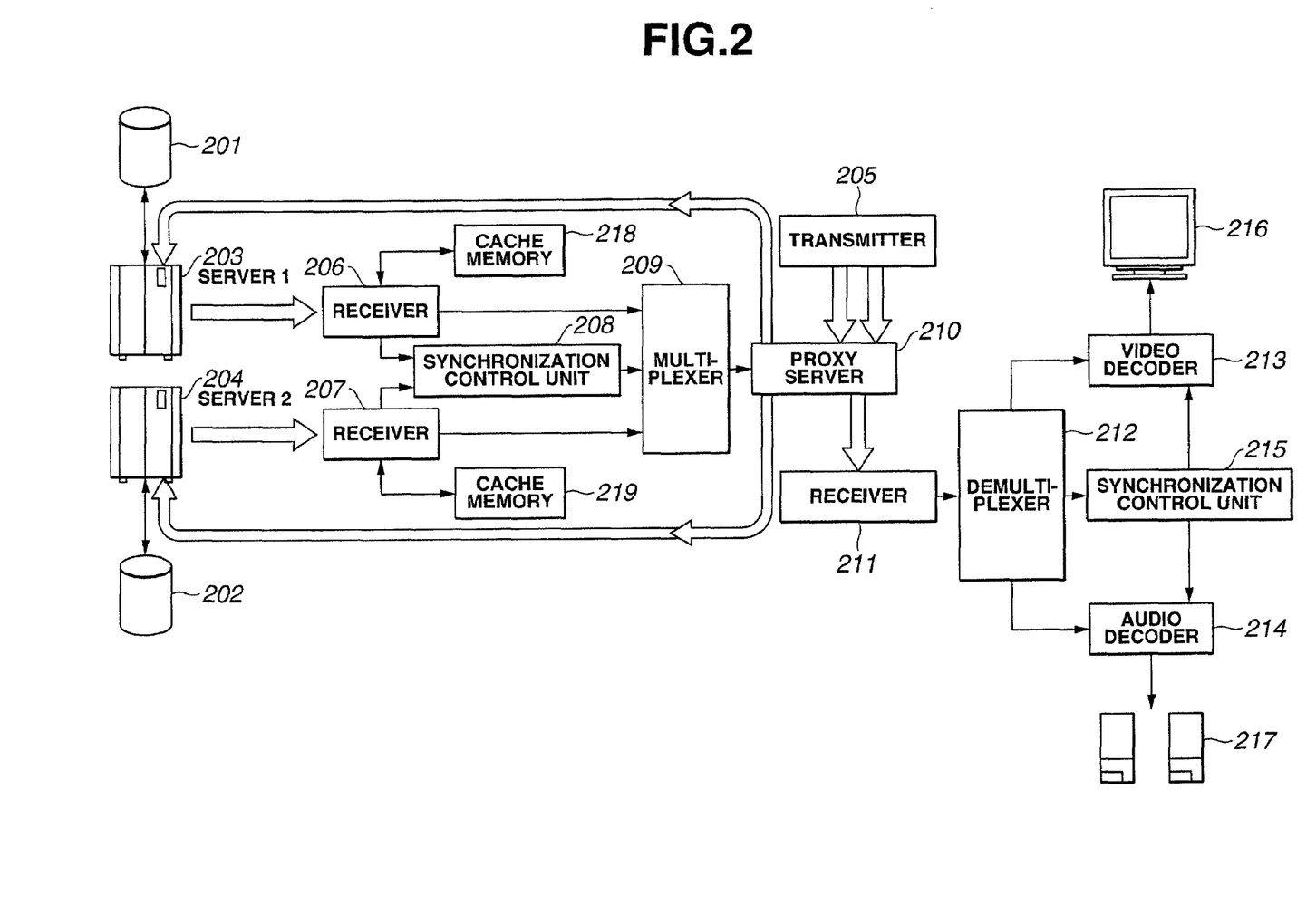
FIG. 2 is a diagram illustrating the configuration of an apparatus according to a second embodiment of the present invention.

FIG. 2 illustrates the configuration of an apparatus according to a second embodiment of the present invention. In FIG. 2, components 201-217 have the same configurations as the components 101-117 shown in FIG. 1, respectively.

The configuration of the apparatus of the second embodiment differs from the configuration of the apparatus of the first embodiment in that cache memories 218 and 219 are provided. Each of the cache memories 218 and 219 temporarily stores data from a server capable of performing high-speed transmission. This may be the case when the state of the transmission channel greatly differs between the server 1 and the server 2, or when there is a problem in the transmission rate, such as when the effective bit rate of transmission of one of the server 1 and the server 2 is very low. Multiplexing is performed in accordance with the transmission speed of another server, so that data transfer from the server capable of performing high-speed transmission is not delayed. That is, the operation of the multimedia-data distribution system of the second embodiment is the same as in the first embodiment, except that a multiplexer 209 performs multiplexing in accordance with the transmission speed of one of the servers, using data stored in the cache memory as data from the server capable of performing high-speed transmission.

Third Embodiment

Figure 6:
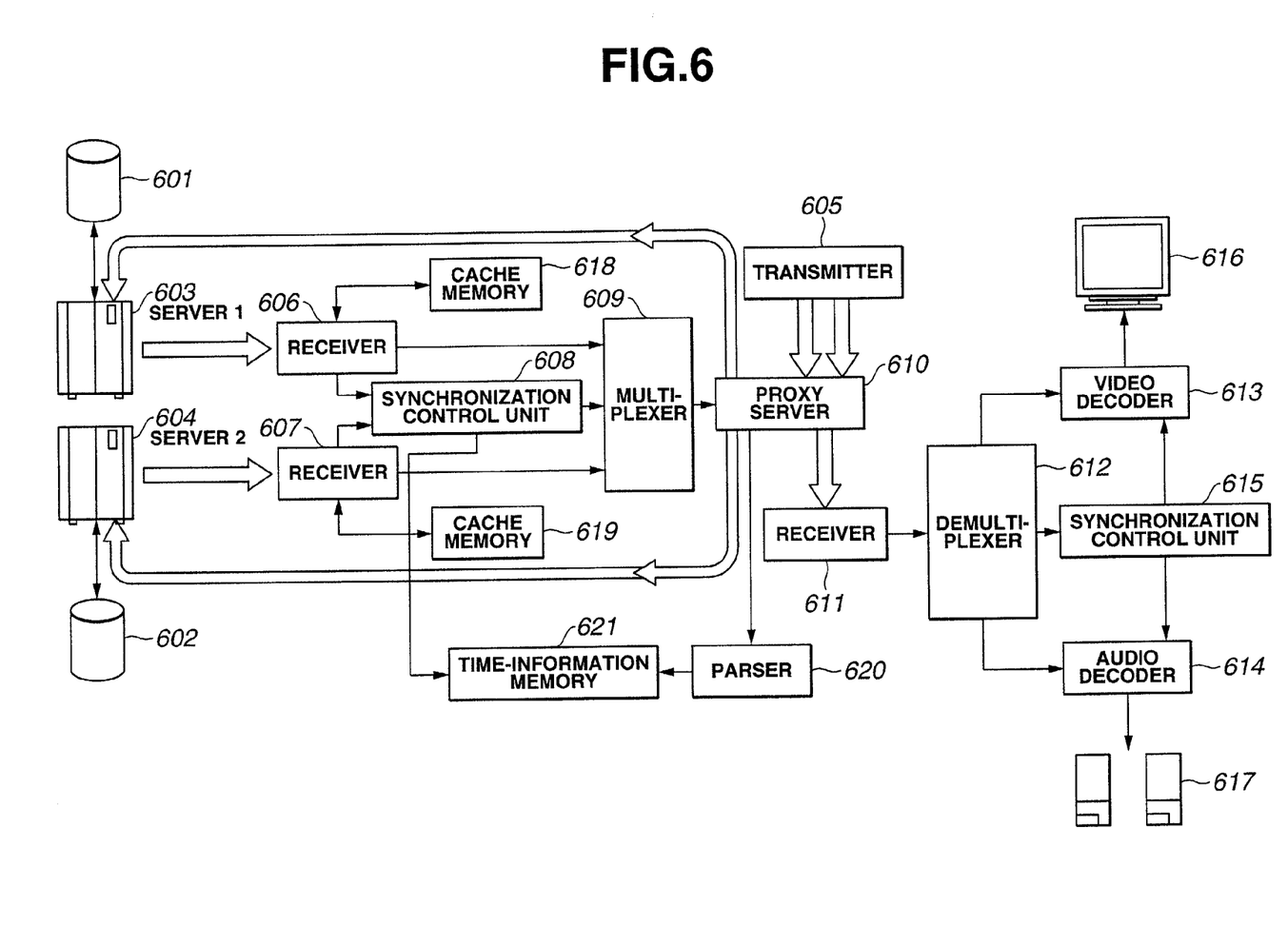
FIG. 6 is a diagram illustrating the configuration of an apparatus according to a third embodiment of the present invention.

FIG. 6 illustrates the configuration of an apparatus according to a third embodiment of the present invention. In FIG. 6, components 601-619 have the same configurations as the components 201-219 in the second embodiment (FIG. 2), respectively.

In the apparatus of the third embodiment, a language describing a plurality of multimedia data is transmitted from a client to a proxy server.

In FIG. 6, a parser 620 interprets a multimedia-data description language transmitted from the client to determine what media streams are included within the language. Although in the third embodiment, the specifications of the description language are not described, the description language sometimes includes time information relating to reproduction of each of a plurality of multimedia data (the time period of reproduction, relative times of reproduction (times to start and end reproduction), the order of reproduction, and the like).

Reference numeral 621 represents a memory for temporarily storing the time information. The memory 621 is utilized simultaneously with each time-stamp information when again multiplexing media data individually transmitted from the server in accordance with the time information.

Figure 8:
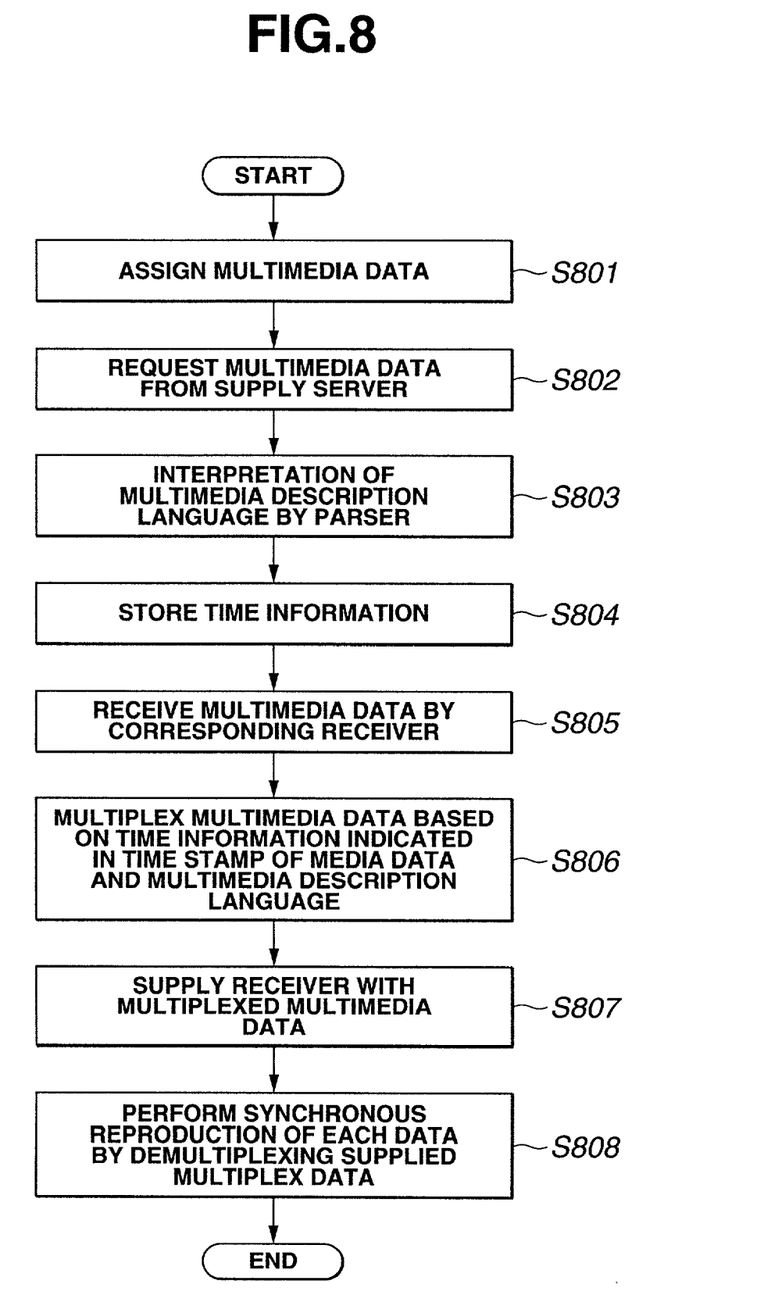
FIG. 8 is a flowchart illustrating an operation by a multimedia distribution system according to a third embodiment of the present invention.

The operation of the multimedia distribution system according to the third embodiment will now be described. FIG. 8 is a flowchart illustrating the operation of the multimedia distribution system of the third embodiment.

In step S801, a proxy server 610 receives assignment of multimedia data from the client. In the first embodiment, only one multimedia data is assigned. In the third embodiment, however, a plurality of multimedia data are assigned according to the multimedia-data description language.

In step S802, the proxy server 610 requests multimedia data from supply servers 603 and 604 having respective distributed multimedia data, in accordance with the assigned multimedia data.

In step S803, the parser 620 interprets the multimedia-data description language supplied from the proxy server 610. In step S804, time information for reproducing a plurality of assigned multimedia data (the time period of reproduction, relative times of reproduction (times to start and end reproduction), the order of reproduction, and the like) is stored in the time-information memory 621.

In step S805, receivers 606 and 607 receive respective multimedia data transmitted from supply servers 603 and 604, respectively.

In step S806, the multimedia data received by the receivers 606 and 607 are multiplexed by a multiplexer 609 to generate multiplexed multimedia data. At that time, a synchronization control unit 608 performs multiplexing in accordance with the order of reproduction, times of reproduction (times to start and end reproduction), and the like, by referring to time information possessed by respective multimedia data (time stamps) and time information stored in the time-information memory 621.

In step S807, the proxy server 610 transmits a plurality of multiplexed multimedia data to the client.

In step S808, the client demultiplexes the received data, and reproduces original data in accordance with time information described in the multimedia-data description language.

Although the configurations of the above-described first through third embodiments can be realized by hardware, the entire system may, of course, be realized by software. Although video and audio data are illustrated as multimedia data, texts, graphics and the like may also be included.

Although two data distribution servers are used in the first embodiment, the present invention may, of course, also be realized by using at least three data distribution servers.

Figure 9:
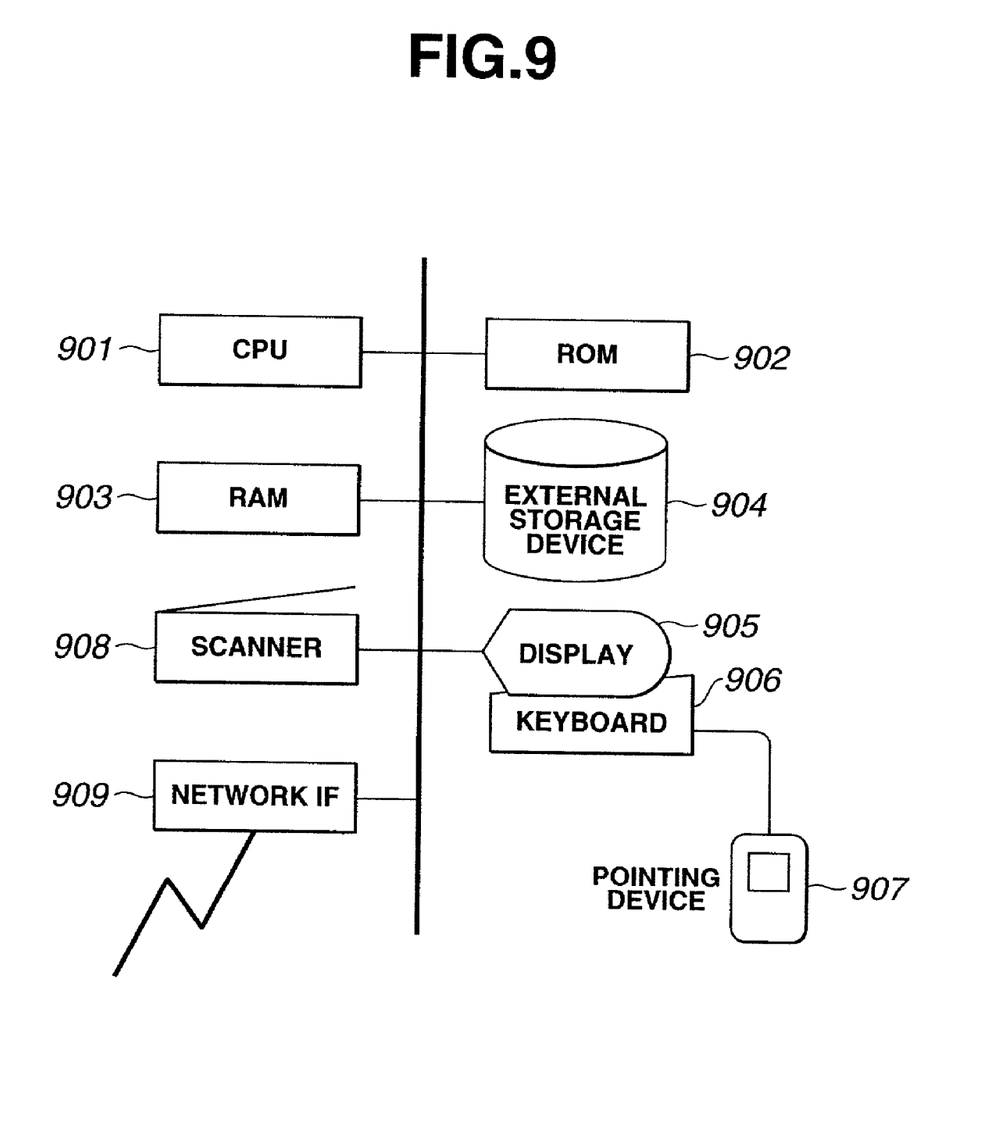
FIG. 9 illustrates a computer capable of realizing each of the embodiments.

FIG. 9 is a diagram illustrating the configuration of an ordinary computer which can be used for a proxy server, a client or a distribution server. In FIG. 9, a CPU (central processing unit) 901 controls the entire apparatus in accordance with control programs stored in a ROM (read-only memory) 902. The ROM 902 stores programs for causing the CPU 901 to execute the sets of processing shown in the above-described flowcharts. A RAM (random access memory) 903 is used as working areas when the CPU 901 performs various sets of processing, or stores document image data and the like. An external storage device 904 comprises a magnetic disk or the like. There are also shown a display 905, a keyboard 906, a pointing device 907, such as a mouse or the like, and an image scanner 908 for reading images. A network interface (IF) 909 communicates with an apparatus (not shown) present at a remote location, and reads and writes programs, data and the like. Although in the case of FIG. 9, programs are stored in the ROM 902, the programs may be stored in an external storage device, such as a floppy disk, a CD(compact-disc)-ROM or the like, and may be read and executed whenever necessary. Alternately, the programs may be received from an external apparatus via a network and may be executed.

The present invention may be applied to a system comprising a plurality of apparatuses (such as a host computer, an interface apparatus, a reader, a printer and the like), or to an apparatus comprising a single unit (such as a copier, a facsimile apparatus or the like).

The object of the present invention may, of course, also be achieved by supplying a system or an apparatus with a storage medium storing program codes of software for realizing the functions of the above-described embodiments, and reading and executing the program codes stored in the storage medium by means of a computer (or a CPU or an MPU (microprocessor unit)) of the system or the apparatus. In such a case, the program codes themselves read from the storage medium realize the functions of the above-described embodiments, so that the storage medium storing the program codes constitutes the present invention. For example, a floppy disk, a hard disk, an optical disk, a magnetooptical disk, a CD-ROM, a CD-R (recordable), a magnetic tape, a nonvolatile memory card, a ROM or the like may be used as the storage medium for supplying the program codes.

The present invention may, of course, be applied not only to a case in which the functions of the above-described embodiments are realized by executing program codes read by a computer, but also to a case in which an OS (operation system) or the like operating in a computer executes a part or the entirety of actual processing, and the functions of the above-described embodiments are realized by the processing.

The present invention may, of course, be applied to a case in which, after writing program codes from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

As described above, according to the present invention, it is possible to construct distributed multimedia servers without taking into consideration the influence of the effective rate of a transmission channel from a server to a client.

The individual components shown in outline or designated by blocks in the drawings are all well known in the multimedia-data transmission system, apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A multimedia-data transmission system for transmitting multimedia data via a network, said system comprising:
   a plurality of clients, each of which assign via the network multimedia data to be transmitted;
   a first multimedia data storage server which stores a first type of multimedia data to be reproduced in synchronization with a corresponding second type of multimedia data and transmits via the network the stored first type of multimedia data to a proxy server upon receiving a request for the multimedia data from the proxy server;
   a second multimedia data storage server which stores the second type of multimedia data, corresponding to the first type of multimedia data, to be reproduced in synchronization with the corresponding first type of multimedia data and transmits via the network the stored second type of multimedia data to the proxy server upon receiving a request for the multimedia data from the proxy server; and
   a proxy server that receives the first type of multimedia data to be reproduced in synchronization transmitted from the first multimedia data storage server, receives the corresponding second type of multimedia data to be reproduced in synchronization transmitted from the second multimedia data storage server, multiplexes the received first type of multimedia data and the corresponding second type of multimedia data, and transmits the multiplexed multimedia data to at least one of the clients which assign the multimedia data to be transmitted,
   wherein the proxy server comprises:
   a first receiver that receives from one of the plurality of clients an assignment of multimedia data to be transmitted to the client;
   a determiner for determining, based on multimedia data assigned by the one of the plurality of clients, the first multimedia data storage server storing the first type of multimedia data and the second multimedia data storage server storing the second type of multimedia data;
   a requester for requesting that the first multimedia data storage server provide the first type of multimedia data to be reproduced in synchronization and for requesting that the second multimedia data storage server provide the corresponding second type of multimedia data to be reproduced in synchronization, based on the determination by the determiner;
   a second receiver for receiving via the network the first type of multimedia data to be reproduced in synchronization transmitted from the first multimedia data storage server and for receiving via the network the corresponding second type of multimedia data to be reproduced in synchronization transmitted from the second multimedia data storage server in accordance with the request by the requestor;
   a parser for analyzing a multimedia description language describing a mutual relationship among the first type of multimedia data and the second type of multimedia data, transmitted from said client;
   a reproducing-information memory for storing reproducing information for the first type of multimedia data and the second type of multimedia data output from said parser;
   a multiplexer for multiplexing the received first type of multimedia data and the corresponding second type of multimedia data based on a timestamp added to the received first type of multimedia data and the second type of multimedia data and the reproducing information stored in said reproducing-information memory; and
   transmission means for transmitting via the network the multiplexed multimedia data obtained as a result of the multiplexing to said one client which assigned the multimedia data to be transmitted.

2. A system according to claim 1, wherein the first type and second type of multimedia data includes at least one of video data, audio data, graphic data and text data to be reproduced in synchronization.

3. A system according to claim 1, wherein said second receiver further comprises a cache memory for temporarily storing the received first type and second type of multimedia data, in order to absorb a difference between speeds of transmission from the first and second multimedia data storage servers.

4. A transmission method implemented in a proxy server for controlling the proxy server which receives a first type of multimedia data to be reproduced in synchronization transmitted from a first multimedia data storage server, and receives a corresponding second type of multimedia data to be reproduced in synchronization transmitted from a second multimedia data storage server, and transmits via a network, multiplexed multimedia data to at least one of a plurality of clients which assign multimedia data to be transmitted, said method comprising:

a first receiving step of receiving, from one of the plurality of clients, an assignment of multimedia data to be transmitted to the client;

a determining step of determining, based on multimedia data assigned by the one of the plurality of clients, the first multimedia data storage server storing the first type of multimedia data and the second multimedia data storage server storing the second type of multimedia data;

a requesting step of requesting that the first multimedia data storage server provide the first type of multimedia data to be reproduced in synchronization and requesting that the second multimedia data storage server provide the corresponding second type of multimedia data to be reproduced in synchronization, based on the determination in the determining step;

a second receiving step of receiving via the network the first type of multimedia data to be reproduced in synchronization transmitted from the first multimedia data storage server and receiving via the network the corresponding second type of multimedia data to be reproduced in synchronization transmitted from the second multimedia data storage server in accordance with the request by the requesting step;

a parsing step of a parser analyzing a multimedia description language describing a mutual relationship among the first type of multimedia data and the second type of multimedia data, transmitted from said client;

a storing step of storing reproducing information, in a reproducing-information memory, for the first type of multimedia data and the second type of multimedia data output from said parser;

a multiplexing step of obtaining multiplexed multimedia data by multiplexing the received first type of multimedia data and the corresponding second type of multimedia data based on a timestamp added to the received first type of multimedia data and the second type of multimedia data and the reproducing information stored in said reproducing-information memory; and a transmission step of transmitting via the network the multiplexed multimedia data obtained as a result of the multiplexing to the one client which transmitted the assignment.

5. A method according to claim 4, wherein the first type and second type of multimedia data includes at least one of video data, audio data, graphic data and text data to be reproduced in synchronization.

6. A method according to claim 4, further comprising temporarily storing the first type of multimedia data and the second type of multimedia data received in said second receiving step to a cache memory, and wherein a difference between speeds of transmission of multimedia data from the first type and second type of servers is absorbed in said storing step.

7. A computer-executable program stored in a computer-readable storage medium, the program for controlling a proxy server which receives a first type of multimedia data to be reproduced in synchronization transmitted from a first multimedia data storage server, and receives a corresponding second type of multimedia data to be reproduced in synchronization transmitted from a second multimedia data storage server, and transmits via a network multiplexed multimedia data to at least one of a plurality of clients which assign multimedia data to be transmitted, said computer program comprising:

code for a first receiving step for receiving, from one of the plurality of clients, an assignment of multimedia data to be transmitted to the client;

code for determining, based on the multimedia data assigned by the one of the plurality of clients, the first multimedia data storage server storing the first type of multimedia data and the second multimedia data storage server storing the second type of multimedia data;

code for requesting that the first multimedia data storage server provide the first type of multimedia data to be reproduced in synchronization and for requesting that the second multimedia data storage server provide the corresponding second type of multimedia data to be reproduced in synchronization, based on the determination of the determining code;

code for a second receiving step for receiving via the network the first type of multimedia data to be reproduced in synchronization transmitted from the first multimedia data storage server and for receiving via the network the corresponding second type of multimedia data to be reproduced in synchronization transmitted from the second multimedia data storage server in accordance with the request by the requesting code;

code for a parsing step of a parser for analyzing a multimedia description language describing a mutual relationship among the first type of multimedia data and the second type of multimedia data, transmitted from said client;

code for a storing step of storing, in a reproducing-information memory, reproducing information for the first type of multimedia data and the second type of multimedia data output from said parser;

code for a multiplexing step for obtaining multiplexed multimedia data by multiplexing the received first type of multimedia data and the corresponding second type of multimedia data based on a timestamp added to the received first type and second type of multimedia data and the reproducing information stored in said reproducing-information memory; and code for transmitting via the network the multiplexed multimedia data obtained as a result of the multiplexing to the one client which transmitted the assignment.

8. A proxy server for receiving a first type of multimedia data to be reproduced in synchronization transmitted from a first multimedia data storage server and for receiving a corresponding second type of multimedia data to be reproduced in synchronization transmitted from a second multimedia data storage server, and for transmitting via a network, multiplexed multimedia data to at least one of a plurality of clients which assign multimedia data to be transmitted, said proxy server comprising:

a first receiver for receiving from one of the plurality of clients an assignment of multimedia data to be transmitted to the client;

a determiner for determining, based on multimedia data assigned by the one of the plurality of clients, the first multimedia data storage server storing the first type of multimedia data and the second multimedia data storage server storing the second type of multimedia data;

a requester for requesting that the first multimedia data storage server provide the first type of multimedia data to be reproduced in synchronization and for requesting that the second multimedia data storage server provide the corresponding second type of multimedia data to be reproduced in synchronization, based on the determination by the determiner;

a second receiver for receiving via the network the first type of multimedia data to be reproduced in synchronization transmitted from the first multimedia data storage server and for receiving via the network the corresponding second type of multimedia data to be reproduced in synchronization transmitted from the second multimedia data storage server in accordance with the request by the requestor;

a parser for analyzing a multimedia description language describing a mutual relationship among the first type of multimedia data and the second type of multimedia data, transmitted from said client;

a reproducing-information memory for storing reproducing information for the first type of multimedia data and the second type of multimedia data output from said parser;

a multiplexer for obtaining multiplexed multimedia data by multiplexing the received first type of multimedia data and the corresponding second type of multimedia data based on a timestamp added to the received first and second type of multimedia data and the reproducing information stored in said reproducing-information memory; and a transmitter for transmitting via the network the multiplexed multimedia data obtained as a result of the multiplexing to the one client which transmitted the assignment.

* * * * *